Figure 1:
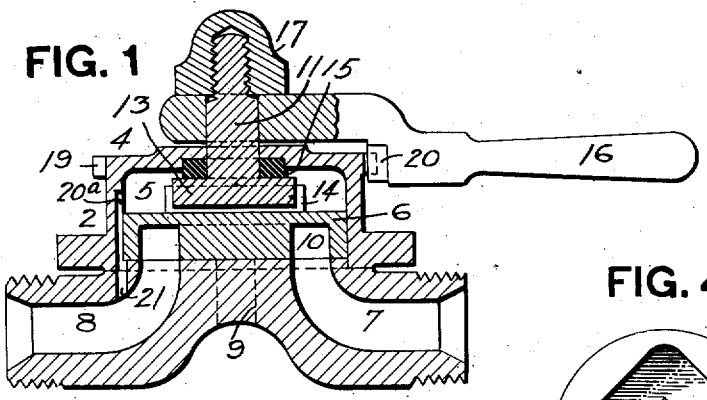

No. 12,677. REISSUED JULY 30, 1907.

C. E. TURNER.

AIR BRAKE APPARATUS.

APPLICATION FILED JUNE 26, 1905.

2 SHEETS—SHEET 1.

WITNESSES.

Robert C. Totten

J. R. Keller

INVENTOR.

Charles E. Turner

By Kay Totten & Winter attorneys

THE NORRIS PETERS CO., WASHINGTON, D. C.

No. 12,677. REISSUED JULY 30, 1907.

C. E. TURNER.

AIR BRAKE APPARATUS.

APPLICATION FILED JUNE 26, 1905.

2 SHEETS—SHEET 2.

WITNESSES.

Robt. C. Totten

J. R. Keller

INVENTOR.

Charles E. Turner

By Kay Totten & Winter attorneys

THE NORRIS PETERS CO., WASHINGTON, D. C.

UNITED STATES PATENT OFFICE.

CHARLES E. TURNER, OF ROCHESTER, NEW YORK, ASSIGNOR, BY DIRECT AND MESNE ASSIGNMENTS, TO THE DUKESMITH AIR BRAKE RELEASE SIGNAL COMPANY, OF MEADVILLE, PENNSYLVANIA, A CORPORATION OF WEST VIRGINIA.

AIR-BRAKE APPARATUS.

No. 12,677. Specification of Reissued Letters Patent. Reissued July 30, 1907.

Original No. 784,526, dated March 7, 1905, Serial No. 216,236. Application for reissue filed June 26, 1905. Serial No. 267,672.

*To all whom it may concern:*

Be it known that I, CHARLES E. TURNER, a citizen of the United States, residing at Rochester, in the county of Monroe and State of New York, have invented new and useful Improvements in Air-Brake Apparatus, of which the following is a specification.

This invention relates to air brake apparatus, and more especially to a valve mechanism distinct from the usual engineer's brake-valve, but located adjacent thereto. In the case of a locomotive the improved valve mechanism will be mounted in the locomotive-cab, although this is not essential, nor do I limit myself to the use of the improved mechanism in connection with steam-railways.

I provide by my invention a device that is simple and effective in action and by which the locomotive driving-wheel brakes can be operated independently of or simultaneously with the other brakes in the system, which other brakes include those on the locomotive-truck and those on the cars.

In the drawings forming a part of this specification I have illustrated one advantageous organization involving my invention, which organization I will fully set forth in the following description; but I do not limit myself to the disclosure thus made, for certain variations may be adopted within the scope of my claims following said description.

Figure 4:
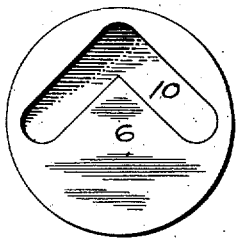
Figure 2:
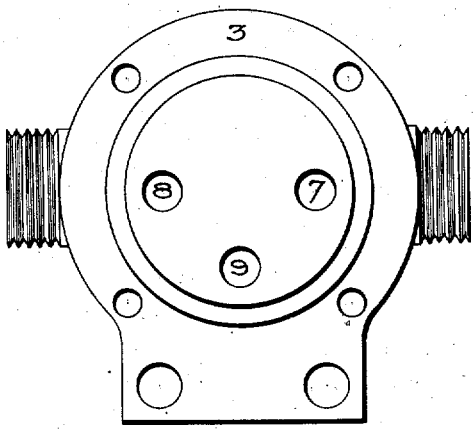
Figure 6:
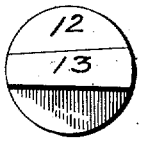
Figure 3:
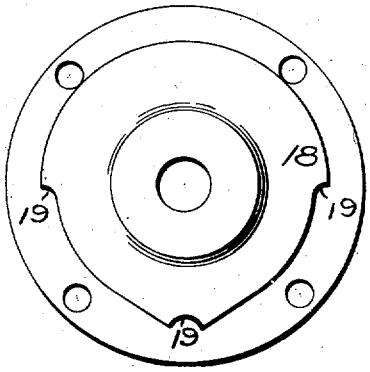
Figure 5:
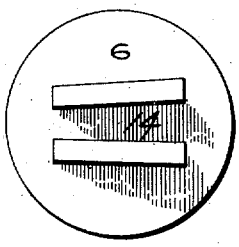
Figure 7:
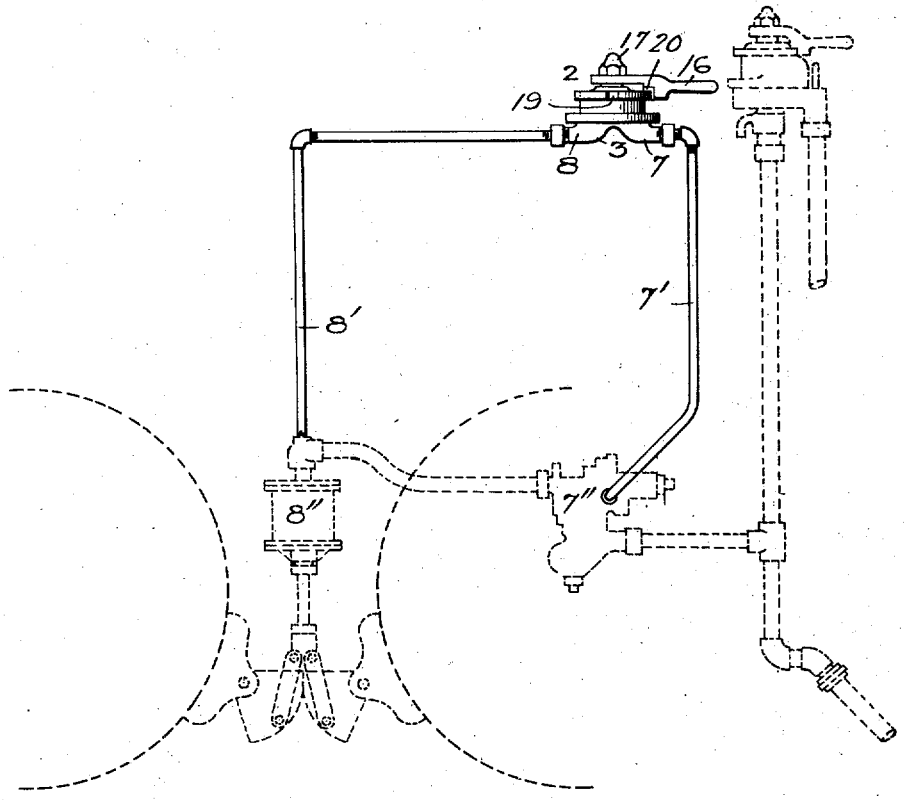

Referring to said drawings, Figure 1 is a sectional elevation of valve mechanism including my invention; Fig. 2 is a top plan view of the body of the casing forming a part of said valve mechanism; Fig. 3 is a similar view of the cover for said casing; Figs. 4 and 5 are bottom and top plan views, respectively, of the valve shown in Fig. 1; Fig. 6 is a bottom plan view of the base of the valve-stem; Fig. 7 is a diagrammatic elevation of my valve mechanism, showing the relation of the same with an air-brake system.

Like characters refer to like parts throughout the different views.

The valve mechanism illustrated is represented as including in its construction a casing, as 2, which may be of any desirable shape or material, said casing being illustrated as consisting of a lower body, as 3, and a cover, as 4, the two parts being provided with flanges suitably fastened together in some air-tight manner.

In the upper part of the casing 2 is a chamber 5, in which a valve, as 6, is mounted for turning movement. The chamber 5 is substantially cylindrical, and the disk-valve 6 rests upon the bottom of said chamber, and its periphery is adapted to traverse the wall of said chamber on the movement thereof. There is a ground fit between the bottom of the chamber 5 and the under face of the valve 6, so as to assure a proper contact between such parts.

A port or passage, as 7, opens at its inner end into the bottom of the chamber 5, said port or passage 7 being adapted for connection, by means of suitable piping hereinafter described, (see Fig. 7) with the release-port of the usual triple valve on the locomotive. A second port, 8, is provided in the casing 2, its inner end opening into the bottom of the chamber 5, while the said second port is adapted for connection by means of suitable piping hereinafter described, with the air end of the brake-cylinder, that is, the end connected to the triple-valve mechanism just alluded to. A third port, as 9, opens into the bottom of the chamber 5 and also opens into the atmosphere. The three ports, 7, 8, and 9, it will be seen, are triangularly arranged, the ports 7 and 8 being diametrically opposite to each other. The valve 6, as will hereinafter appear, is adapted to connect the ports 7 and 8 or to connect either of them with the atmosphere by way of the port 9. To accomplish the results named, I have shown a port or passage, as 10, in the under face of the valve 6, which, it will be seen, is of angular form, whereby it can put the ports 7 and 8 into communication, or either of them into communication, with the port 9.

The stem of the valve 6 is designated by 11, and it extends through the top of the cover 4 and has a circular base 12. On the under side of the base 12 is represented a wedge shaped key 13, adapted to fit a correspondingly-shaped seat 14 in the upper face of the valve 6. The stem 11 of the valve is represented as surrounded by a gasket 15, of rubber or other suitable material, fitting in a countersink in the under side of the cover of the casing, which gasket serves to prevent the flow of air through the perforation in said top, through which said stem extends.

An actuating handle for the valve is shown at 16, the inner end of the handle being connected in some desirable way with the projecting portion of the stem, the extreme outer end of the latter being provided with a cap-nut as 17, bearing against the hub of the handle or lever 16.

Upon the cover 4 is a segment, as 18, having a series of peripheral index-notches, each designated by 19 and adapted to be successively engaged by a pawl 20, carried upon the handle or lever 16, between the ends thereof. Said notches or indentations are for the purpose of indicating the position of the valve 6.

The wall of the chamber 5 is shown as having a perpendicular channel, as 20[a], communicating with the chamber above the valve 6 and also with an auxiliary port 21, opening into what might be considered the main port 8, by reason of which air can flow from said port 8 into the port 21 and from thence through the channel 20ª to the space above the valve 6 to hold the latter firmly down against the bottom of the said chamber 5.

The normal position of the valve 6 is that in which the port 10 connects the ports 7 and 9, whereby the triple valve release port is open to the atmosphere and all the brakes of the train can be controlled in the customary manner by the manipulation of the engineer's brake-valve. Should the engineer desire to hold the engine-driver brakes set after having been applied, he operates the valve 6 by the manipulation of the handle 16 to either lap or close the ports 7 and 8 or to cause the port 10 to put the ports 7 and 8 in communication, the port 9, which leads to the atmosphere, being closed by such action, so that the train-brakes can be released by the engineer's brake-valve without affecting the driving-brakes. To release the driver-brakes, the valve is moved to cause the port 10 therein to put either of the ports 7 and 8 into communication with the port 9, so that the air in the cylinder will be exhausted through either the port 7 or the port 8, port 10 in the valve and port 9 to the atmosphere. Should the wheels on the engine slide after the brakes are set, the said brakes can be released without affecting the train-brakes by putting the ports 8 and 9 into communication through the intervention of the port 10 on the proper manipulation of the valve 6. As previously indicated, the three notches 19 will indicate the several positions to be occupied by the valve in securing the operation set forth.

In Fig. 7 I have illustrated by diagram the connections between the improved valve mechanism and the triple-valve mechanism and brake-cylinder, the casing for the improved valve mechanism in said Fig. 7 being indicated by 2. The piping 7′ connects the port 7 of the said casing with the release port of the triple-valve mechanism, (designated by 7″,) while the piping 8′ connects the port 8 with the air end of the brake-cylinder 8″.

With the air-brake apparatus ordinarily employed it is necessary to release both the engine and train-brakes before the engine-brakes can be held set independently of the train-brakes. With the improved system hereinbefore described this obstacle is not present, for the reason that the engine-brakes can be kept set when the train-brakes are being released, thus enabling an engineer to keep the slack of a train bunched against the engine and preventing the train from breaking in two on account of releasing the brakes while the train is running at a slow speed. The invariable result in actual practice in releasing air-brakes on long trains is that the head-end brakes on the train release sooner than do those on the rear end, for the reason that the mechanical operation of releasing the brakes is due to increasing pressure in the train-pipe, and as this comes from the engine it will be apparent that the front portion of a train will receive the pressure first, and the result is that the head brakes are released first. By the improved device the engine-brakes can be held set while the train-brakes are being released, so that the bad effect of having the slack run out of the train is counteracted by holding the train bunched while the engine-brakes are set. By the improved mechanism the engineer can relieve the pressure of the brake-shoes without affecting the relation of the brakes on the train, which prevents accidents and lessens danger to life and property. By the improved arrangement an engineer can release his driver-brakes independently of the train-brakes, and thereby permit his drivers to cool off in descending heavy grades, while at the same time he can, when necessary or desirable, reset the driver-brakes by using the ordinary air-brake apparatus.

Having thus described my invention, what I claim is—

1. In an air brake system, the combination of an engineer's valve, a brake cylinder and its triple valve, piping connecting these parts, brake control valve mechanism independent of the engineer's valve, and piping connecting the same to the brake cylinder and to the triple valve exhaust port, said brake control valve mechanism being arranged to open the triple valve exhaust port to the atmosphere or to close the same, and to open the brake cylinder to the atmosphere or keep the same closed.

2. In an air brake system, the combination of an engineer's valve, a brake cylinder and its triple valve, piping connecting these parts, valve mechanism independent of the engineer's valve, and piping connecting the same to the brake cylinder and to the triple valve exhaust port, said valve mechanism being arranged by the manipulation of a single handle to open either the brake cylinder or the triple valve exhaust port to the atmosphere, or to keep both closed.

3. In an air-brake apparatus, valve mechanism including a casing having a chamber, provided with three ports opening into the bottom of said chamber, two of the ports being adapted to communicate respectively with the brake-cylinder and release-port of the triple valve of a locomotive and the third port being adapted to communicate with the atmosphere, and a valve fitted against the bottom of the chamber and adapted to put said two ports into communication with said third port, the casing having means for conducting air from one of said two ports into said chamber to act against the upper side of the valve.

4. In an air-brake apparatus, valve mechanism including a casing having two main ports adapted to communicate respectively with the brake-cylinder and release-port of the triple valve on a locomotive, a third port adapted to communicate with the atmosphere, a valve-containing chamber the wall of which has a channel, said casing also having an auxiliary port connecting said channel with one main port, and a valve arranged to put said two main ports into communication with each other or either of them into communication with the port which opens into the atmosphere.

5. In an air-brake apparatus, valve mechanism including a casing having a chamber provided with three triangularly-disposed ports opening into the bottom thereof, one of said ports being adapted to communicate with a brake-cylinder and another with the release-port of a triple-valve mechanism on a locomotive, and the third port being adapted to communicate with the atmosphere, a turning valve in said chamber, provided with an angular port adapted to put two of said ports into communication with each other, or to put either of said two ports into communication with the third port.

CHARLES E. TURNER.

Witnesses:
J. M. STANLEY,
E. H. MCCARTNEY.